April 27, 1937.  N. H. WILLBY  2,078,649
MOTOR CONTROL SYSTEM
Filed March 12, 1936
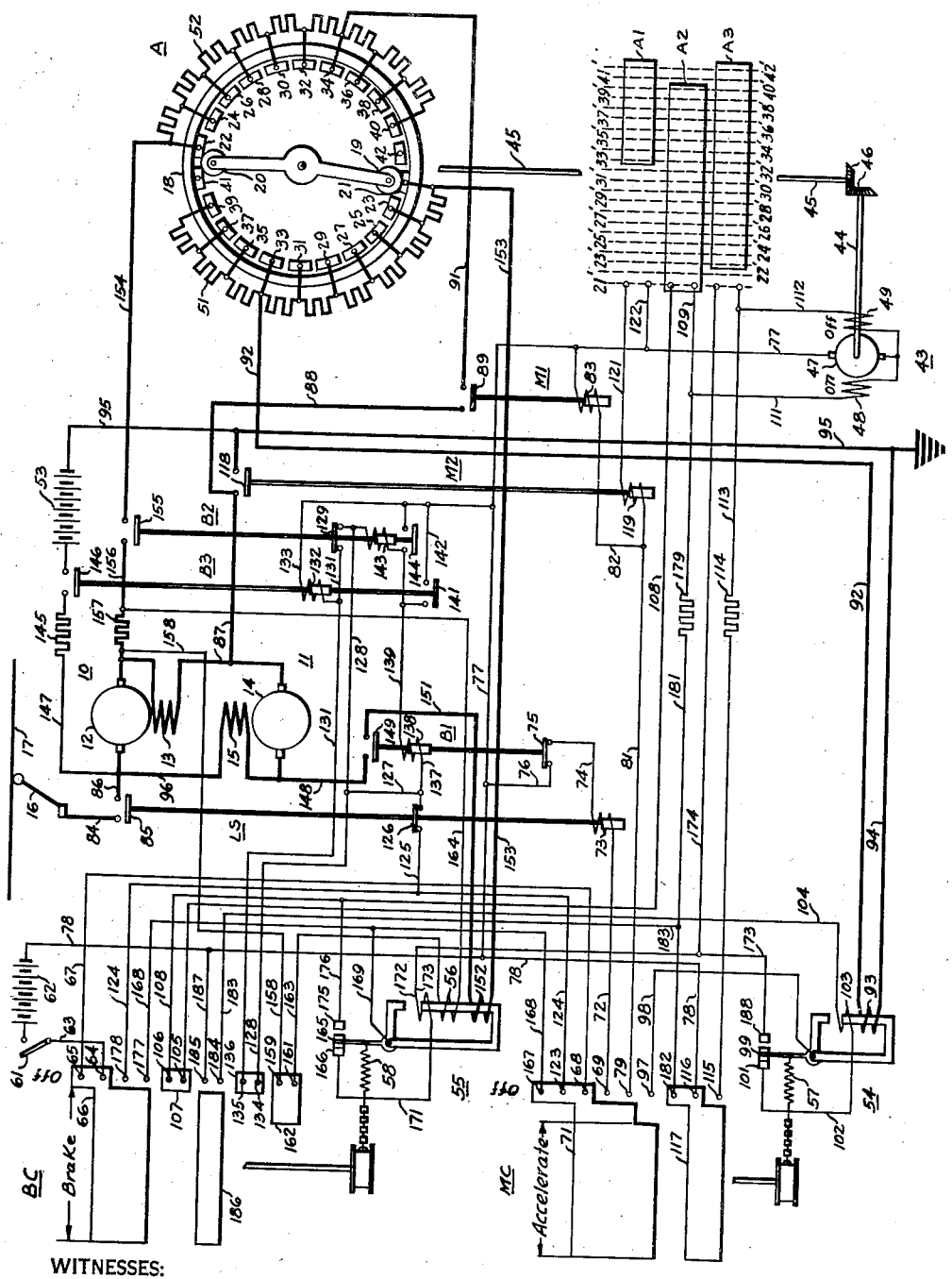
WITNESSES:
Michael Stark
INVENTOR
Norman H. Willby.
ATTORNEY Patented Apr. 27, 1937

2,078,649

UNITED STATES PATENT OFFICE 2,078,649

MOTOR CONTROL SYSTEM

Norman H. Willby, Irwin, Pa., assignor to Westinghouse Electric & Manufacturing Company, East Pittsburgh, Pa., a corporation of Pennsylvania Application March 12, 1936, Serial No. 68,454

13 Claims. (Cl. 172—179)

My invention relates, generally, to motor control systems and more particularly to systems for controlling the operation of electrically-propelled vehicles.

An object of my invention, generally stated, is to provide a system for automatically controlling both the acceleration and the deceleration of an electrically-propelled vehicle which shall be simple and efficient in operation and which may be economically manufactured and installed.

A more specific object of my invention is to provide for decelerating an electrically-propelled vehicle by means of dynamic braking.

Another object of my invention is to provide a quick-acting and smoothly-operating dynamic braking system for an electrically-propelled vehicle.

A further object of my invention is to provide for controlling the operation of a motor-driven accelerator during the acceleration and the deceleration of an electrically propelled vehicle.

Other objects of the invention will be explained fully hereinafter or will be apparent to those skilled in the art.

According to one embodiment of the invention, both the acceleration and the deceleration of an electrically-propelled vehicle are controlled primarily by an accelerator of the type described in Patent No. 1,991,229, issued February 12, 1935 to L. G. Riley and assigned to the Westinghouse Electric & Manufacturing Company. The accelerator comprises a circular copper bus inside of which are disposed a plurality of contact fingers which are progressively forced against the bus by a pair of revolving rollers driven by a pilot motor. One half of the contact fingers are connected to one section of a two-section resistor which is utilized to control the propelling motor current during both acceleration and deceleration of the vehicle, the other half of the contact fingers being connected to the other section of the resistor. The rate of acceleration and deceleration is controlled by governing the speed of the pilot motor by means of limit relays which are responsive to the main motor current, the accelerator resistors being so connected in the main motor circuits that they control the motor current during both acceleration and dynamic braking.

For a fuller understanding of the nature and objects of my invention, reference may be had to the following detailed description, taken in conjunction with the accompanying drawing, in which the single figure is a diagrammatic view of a control system embodying my invention.

Referring to the drawing, a pair of electric motors 10 and 11 may be utilized for propelling a vehicle (not shown). The motor 10 is provided with an armature winding 12 and a series field winding 13. Likewise, the motor 11 is provided with an armature winding 14 and a series field winding 15. An electrically operated line switch LS is provided for connecting the motors 10 and 11 to a trolley 16 which engages a power conductor 17 that may be energized from any suitable source of power, such as a generating station (not shown).

Both the acceleration and the deceleration of the motors 10 and 11 are primarily controlled by a motor-driven accelerator A which is of the same type as the one described in the aforementioned Patent No. 1,991,229. The accelerator A comprises a circular bus 18 inside of which are disposed a plurality of contact fingers 21 to 42, inclusive, which are progressively forced against the bus 18 by a pair of revolving rollers 19 and 20.

The rollers 19 and 20 are driven by a pilot motor 43 through shafts 44 and 45 connected by bevel gears 46. The pilot motor 43 is provided with an armature winding 47 and two field windings 48 and 49, one for each direction of rotation. An electrical braking, which will be more fully described hereinafter, is provided for quick stopping of the pilot motor.

The accelerator A is provided with resistors 51 and 52 for controlling the current in the motors 10 and 11. The resistor 51 is divided into a number of sub-divisions which are connected to the odd-numbered contact fingers 21 to 39, inclusive, and the resistor 52 is divided into subdivisions which are connected to the even-numbered contact fingers 22 to 40, inclusive. The accelerator resistor is divided into two sections and the one section grounded, in order to reduce the maximum voltage of the motors 10 and 11 above ground during dynamic braking.

As shown, a number of cam switches A1, A2 and A3 are located in the accelerator and are actuated by the shaft 45. The reference numerals 21' to 42' indicate the contact fingers over which the rollers 19 and 20 travel while the cam switches are closed. The function of the cam switches in the control system will be explained more fully hereinafter.

In addition to the accelerator and the cam switches, numerous other switches are provided for performing certain switching operations. These switches include a switch M1 for connecting the motors 10 and 11 to the resistor 52 during acceleration, a switch M2 for connecting one terminal of the motors directly to ground after a major portion of the resistors have been shunted from the motor circuit by the accelerator rollers, switches B1 and B2 for establishing dynamic braking connections for the motors 10 and 11 and a switch B3 for connecting a battery 53 in the motor circuit to cause a current to circulate through the motors during coasting of the vehicle.

Drum controllers MC and BC are provided for controlling the motor connections during acceleration and braking, respectively. These controllers are electrically interlocked to prevent improper operation of the equipment.

A current limit relay 54 functions to limit the motor current during acceleration by regulating the operation of the accelerator A, the contact members of the relay being disposed to control the operation of the pilot motor 43. A similar relay 55 is provided for controlling the pilot motor during coasting and dynamic braking of the vehicle. In order that the relay 55 will operate satisfactorily on both the relatively high motor current produced during braking and the low circulating current produced during coasting, provision is made for recalibrating the relay when the vehicle is coasting. This is accomplished by providing the relay with an additional coil 56 which is energized by a current proportional to the motor current that circulates during coasting.

In order that the rate of acceleration may be controlled by the operator within certain limits, the relay 54 is provided with a spring 57 the tension of which is controlled by means of the controller MC. Likewise, the tension of a spring 58 on the relay 55 may be controlled by means of the controller BC to vary the rate of dynamic braking.

With a view to preventing a sudden rush of current upon the application of power or dynamic braking after coasting of the vehicle, the small current, which is permitted to circulate through the motors 10 and 11 during coasting and which is proportional to the speed of the vehicle, is utilized to effect spotting of the accelerator A by changing the position of the rollers 19 and 20 to match the car speed. The current which is permitted to circulate during coasting is of such a low value that it has no appreciable braking effect. However, as stated hereinbefore, the relay 55 is recalibrated to be responsive to the low current and the relay is utilized to cause the pilot motor 43 to operate in the proper direction to advance or retract the rollers as the car gains or loses speed while coasting.

In order that the functioning of the foregoing apparatus may be more clearly understood, the operation of the system will now be described in more detail.

Assuming that a control switch 61 has been closed, the motors 10 and 11 may be connected to the power source by actuating the master control MC to the switching position, thereby closing the switches LS and M1. The energizing circuit for the actuating coil of the switch LS may be traced from the positive terminal of a battery 62 through the switch 61, conductor 63, contact fingers 64 and 65 bridged by a contact segment 66 on the controller BC, conductor 67, contact fingers 68 and 69 bridged by a contact segment 71 on the controller MC, conductor 72, the actuating coil 73 of the switch LS, conductor 74, an interlock 75 on the switch B1, and conductors 76, 77 and 78 to the negative terminal of the battery 62.

The energizing circuit for the actuating coil of the switch M1 extends from a contact finger 79, which engages the contact segment 71 of the controller MC, through conductors 81 and 82, the actuating coil 83 of the switch M1 and conductors 77 and 78 to the negative terminal of the battery 62.

The closing of the switches LS and M1 connects the motors 10 and 11 to the power conductor 17 in parallel-circuit relation and in series with a major portion of the resistors 51 and 52 in the accelerator A. The circuit through the motor 10 may be traced from the power conductor 17 through the trolley 16, conductor 84, contact members 85 of the switch LS, conductor 86, the armature winding 12 of the motor 10, the series field winding 13, conductors 87 and 88, contact members 89 of the switch M1, conductor 91, a portion of the resistor 52, contact finger 22 on the accelerator A, the bus 18, contact finger 21, a portion of the resistor 51, conductor 92, a coil 93 on the limit relay 54 and conductor 94 to a grounded conductor 95. The circuit through the motor 11 extends from the conductor 86 through conductor 96, the series field winding 15 and the armature winding 14 of the motor 11 to the conductor 87 and thence through the circuit previously traced to the grounded conductor 95.

Since a major portion of the resistors 51 and 52 are connected in the motor circuits, the vehicle will be operated at a slow speed. If it is desired to accelerate the vehicle, the master controller MC may be actuated to one of the accelerating positions, thereby energizing the pilot motor 43 to revolve the rollers 19 and 20 of the accelerator A which shunt the resistors 51 and 52 from the motor circuit in a step-by-step manner. The energizing circuit for the pilot motor 43 may be traced from a contact finger 97, which engages the segment 71 of the controller MC, through conductor 98, contact members 99 and 101 on the limit relay 54, conductor 102, a coil 103 of the relay 54, conductor 104, contact fingers 105 and 106 bridged by a segment 107 on the controller BC, conductor 108, the cam switch A2 on the accelerator A, conductors 109 and 111, the field winding 46, an armature winding 47 of the pilot motor 43, and conductors 77 and 78 to the negative terminal of the battery 62.

In this manner the pilot motor 43 operates the accelerator A to accelerate the vehicle under the control of the limit relay 54, the rate of acceleration depending upon the tension applied to the spring 57 by means of the master controller MC. When the accelerator is advanced to a position in which sufficient current flows through the coil 93 of the limit relay 54 to overcome the force of the spring 57, the contact members 99 and 101 of the relay are separated, thereby disconnecting the pilot motor 43 from the battery 62 and permitting an electrical braking to be established which quickly stops the motor 43. The braking circuit may be traced from one terminal of the armature winding 47 through the field winding 46, conductors 112 and 113, a resistor 114, contact fingers 115 and 116 bridged by a contact segment 117 on the controller MC and conductors 78 and 77 to the other terminal of the armature winding 47. When the motor current decreases to a value which permits the spring 57 to reclose the contact members 99 and 101, the motor 43 is reenergized to advance the accelerator A, thereby accelerating the vehicle.

In this manner, the rollers 19 and 20 of the accelerator A are advanced until those portions of the resistors 51 and 52 which were originally connected in the motor circuit are shunted from the motor circuits, at which time the switch M2 is closed to connect one terminal of the motors 10 and 11 directly to the grounded conductor 95.

through contact members 118 of the switch M2. The energizing circuit for the actuating coil of the switch M2 may be traced from the previously energized conductor 81 through the actuating coil 119, conductor 121, the cam switch A1, conductors 122, 77 and 78 to the negative terminal of the battery 62.

However, the pilot motor 43 will continue to advance the accelerator rollers 19 and 20 until they depress contact fingers 41 and 42, respectively, in order that the maximum amount of resistance 51 and 52 will be available for controlling the motor current during dynamic braking of the vehicle, it being understood that more resistance may be required to control the motor current during dynamic braking than during acceleration, since the motors may be operating at a higher speed during dynamic braking than during normal acceleration of the vehicle.

If it is desired to permit the vehicle to coast, the motors 10 and 11 may be disconnected from the power source by actuating the controller MC to the off position, thereby permitting the line switch LS and the switches M1 and M2 to open. However, the switches B1, B2 and B3 are closed at this time in order to establish the dynamic braking connections for the motors 10 and 11 and to connect the battery 53 into the motor circuit to cause a small current to circulate through the motors during coasting which is utilized to match the position of the accelerator A with the car speed, thereby insuring that the accelerator will be in the proper position to prevent an excessive flow of current through the motors 10 and 11 in the event that power is reapplied to the motors or dynamic braking is required.

The battery 53 is also utilized to energize the field winding of one of the motors to insure that the motor current will build up rapidly to produce the dynamic braking effect quickly in the event that it is required to stop the vehicle. The energizing circuit for the actuating coil of the switch B3 may be traced from a contact finger 123 on the controller MC through conductors 124 and 125, an interlock 126 on the switch LS, conductors 127 and 128, an interlock 129 on a switch B2, conductor 131, the actuating coil 132 of the switch B3 and conductors 133, 77 and 78 to the negative terminal of the battery 62. A parallel circuit for the coil 132 is also established from conductor 128 through contact fingers 134 and 135, bridged by a segment 136 on the controller BC, to the conductor 131.

Following the closing of the switch B3, the switches B1 and B2 are closed. The energizing circuit for the actuating coil of the switch B1 extends from the previously energized conductor 125 through the interlock 126 on the switch LS, conductor 137, the actuating coil 138, conductor 139, an interlock 141 on the switch B3 and conductors 142, 77 and 78 to the battery 62. The energizing circuit for the actuating coil of the switch B2 extends from the previously energized conductor 128 through the coil 143 to the conductor 139 and thence through the circuit previously traced to the battery 62. A holding circuit for the actuating coils of the switches B1 and B2 is established by the closing of an interlock 144 on the switch B2. The holding circuit may be traced from the conductor 139 through the interlock 144 to the conductor 133 and thence through conductors 77 and 78 to the battery 62.

As stated hereinbefore, the closing of the switch B3 energizes the field winding 15 of the motor 11 with a small current which is limited by a resistor 145 and a portion of the accelerator resistor 51. This causes a current to circulate through the motors 10 and 11 which is proportional to the vehicle speed, thereby providing a means for governing the position of the accelerator A while the vehicle is coasting. The circuit through the field winding 15 may be traced from the positive terminal of the battery 53 through contact members 146 of the switch B3, the resistor 145, conductors 147 and 96, the field winding 15, conductor 148, contact members 149 of the switch B1, conductor 151, a coil 152 on the limit relay 55, conductor 153, a portion of the resistor 51, conductor 92, the coil 93 of the limit relay 54 and conductors 94 and 95 to the negative terminal of the battery 53.

The closing of the switches B1 and B2 establishes the dynamic braking connections for the motors 10 and 11 whereby the field winding of one motor is connected across the armature winding of the other motor which permits a dynamic braking current to flow through the motors. The circuit through the field winding 15 may be traced from one terminal of the armature 12 through conductor 96, the field winding 15, conductor 148, contact members 149 of the switch B1, conductor 151, the coil 152 of the limit relay 55, conductor 153, the resistor 51, the bus 18, the resistor 52, conductor 154, contact members 155 of the switch B2, conductor 156 and a resistor 157 to the other terminal of the armature winding 12. The circuit through the field winding 13 may be traced from one terminal of the armature winding 14, through conductor 148, contact members 149 of the switch B1, conductor 151, the coil 152, conductor 153, the resistor 51, the bus 18, the resistor 52, conductor 154, contact members 155, conductor 156, resistor 157, field winding 13 and conductor 87 to the other terminal of the armature winding 14.

As stated hereinbefore a small current is permitted to circulate through the motors 10 and 11 during coasting which is utilized to cause the limit relay 55 to govern the position of the accelerator rollers 19 and 20 to match the vehicle speed. In order that the limit relay 55 will function properly on a small current, the relay is recalibrated by means of a coil 56 which is connected across the resistor 157, thereby being responsive to the circulating current. The energizing circuit for the coil 56 may be traced from one terminal of the resistor 157 through conductor 158, contact fingers 159 and 161, bridged by a segment 162 on the controller BC, conductor 163, the coil 56 and conductor 164 to the other terminal of the resistor 157.

It will be observed that the contact members of the relay 55 are so connected in the circuit for the pilot motor 43 that the motor may be operated in either direction to properly spot the accelerator A during coasting of the vehicle. If the circulating current is below a predetermined value, the contact members 165 and 166 of the relay 55 are engaged to operate the pilot motor in the reverse direction. The circuit through the pilot motor may be traced from a contact finger 167 on the controller MC, through conductors 168 and 169, contact members 165 and 166, conductor 171, a coil 172 on the relay 55, conductors 173 and 174, the cam switch A3, conductor 112, the field winding 49, the armature winding 47 and conductors 77 and 78 to the battery 62.

If the vehicle gains in speed while coasting, thereby increasing the circulating current, the relay 55 operates to close contact members 165 and 175, thereby operating the pilot motor in the forward direction. The energizing circuit for the pilot motor extends from the contact member 175 through conductors 176 and 169, the cam switch A2, conductors 109 and 111, field winding 48, the armature winding 47 and conductors 77 and 78 to the battery 62. In this manner, the relay 55 functions to spot the accelerator A during coasting of the vehicle, thereby insuring that the proper amount of resistance will be available to control the motor current in case it is desired to reconnect the motors to the power circuit or to utilize dynamic braking to stop the vehicle.

If it is desired to stop the vehicle by means of dynamic braking, the controller BC is actuated to one of the braking positions, in which case the switch B3 is opened to disconnect the battery 53 from the motor circuit. However, the switches B1 and B2 remain closed to maintain the dynamic braking connections for the motors. The motor current during dynamic braking is governed by the accelerator A in a manner similar to that utilized during acceleration of the vehicle, the operation of the pilot motor 43 being under the control of the limit relay 55. It will be noted that the conductor 168 is connected to the battery 62 through contact fingers 177 and 64 on the braking controller BC and also the conductor 124 is connected to the battery 62 through contact fingers 178 and 64, thereby permitting the system to function properly during dynamic braking regardless of the position of the master controller MC.

A braking circuit for the pilot motor 43 similar to that utilized during acceleration may be established to quickly stop the pilot motor 43 during dynamic braking. As previously stated, the pilot motor is operated in the reverse direction while the contact members 165 and 166 of the relay 55 are closed thereby operating the rollers 19 and 20 in a direction to shunt the resistors 51 and 52 from the motor circuit during dynamic braking. However, when the main motor current is of sufficient value to operate the relay 55 to open the contact members 165 and 166, a braking circuit is established for the pilot motor 43 to stop it quickly without the aid of a mechanical brake. This circuit may be traced from one terminal of the armature winding 47 through the field winding 48, conductors 111 and 109, a resistor 179, conductor 181 and either through contact fingers 182 and 116 on the master controller MC and conductors 78 and 77 to the other terminal of the armature 47, or through conductor 183 and contact fingers 184 and 185 bridged by segment 186 on the controller BC and conductors 187 and 78 and 77 to the other terminal of the armature 47. In this manner, the pilot motor 43 will be quickly stopped by the operation of the limit relay 55.

If it is desired to effect an easy shut off of power from the propelling motors during acceleration of the vehicle, the pilot motor 43 may be reversed by means of the limit relay 54 to cause a portion of the resistors 51 and 52 to be inserted in the motor circuit before the opening of the line switch LS to disconnect the motors from the power source. This may be accomplished by actuating the controller MC toward, but not entirely to, the switching position, thereby releasing the tension on the spring 57 on the relay 54. In this manner the contact member 99 of the relay 54 is permitted to engage a contact member 188, thereby reversing the direction of the pilot motor 43 which will cause a portion of the resistors 51 and 52 to be inserted in the motor circuit. The reversing circuit for the pilot motor 43 may be traced from the contact member 188 on the limit relay 54 to conductors 173 and 174, the cam switch A3, the field winding 49, the armature winding 47 and conductors 77 and 78 to the negative terminal of the battery 62. As stated hereinbefore when the master controller is operated to the off position, the switches LS, M1 and M2 are opened to completely disconnect the motors 10 and 11 from the power source.

From the foregoing description, it is apparent that I have provided a quick acting and smoothly operating dynamic braking system for an electrically propelled vehicle which is simple and efficient in operation. I have also provided a control system for an electrically propelled vehicle in which a motor driven accelerator is utilized to control the propelling motor current both during acceleration and deceleration of the vehicle, and I have devised a simple and efficient method of controlling the operation of the motor driven accelerator.

Since many modifications may be made in the apparatus and arrangement of parts without departing from the spirit of my invention, I do not wish to be limited other than by the scope of the appended claims.

I claim as my invention:

1. In a motor control system, in combination, a motor for propelling a vehicle, a source of power for the motor, switching means for connecting the motor to the power source, switching means for establishing dynamic braking connections for the motor, a separate source of power for causing a current to circulate through the motor during coasting of the vehicle, and means responsive to the circulating current for regulating said current.

2. In a motor control system, in combination, a plurality of motors for propelling a vehicle, a source of power for the motors, switching means for connecting the motors to the power source, switching means for establishing dynamic braking connections for the motors, a separate source of power for causing a current to circulate through the motors during coasting of the vehicle, and means responsive to the circulating current for regulating said current.

3. In a motor control system, in combination, a plurality of motors for propelling a vehicle, a source of power for the motors, switching means for connecting the motors to the power source, resistance-varying means for controlling the motor current during acceleration of the vehicle, switching means for establishing dynamic braking connections for the motors, a separate source of power for causing a current to circulate through the motors during coasting of the vehicle, and means responsive to said circulating current for controlling the operation of the resistance-varying means.

4. In a motor control system, in combination, a plurality of motors for propelling a vehicle, a source of power for the motors, switching means for connecting the motors to the power source, resistance-varying means for controlling the motor current during acceleration of the vehicle, switching means for establishing dynamic braking connections for the motors, a separate source of power for causing a current to circulate through the motors during coasting of the vehicle, said resistance-varying means being utilized to control the motor current during dynamic braking, and means responsive to said circulating current for controlling the operation of the resistance-varying means during coasting of the vehicle.

5. In a motor control system, in combination, a plurality of motors for propelling a vehicle, a source of power for the motors, switching means for connecting the motors to the power source, resistance-varying means for controlling the motor current during acceleration of the vehicle, switching means for establishing dynamic braking connections for the motors, a separate source of power for causing a current to circulate through the motors during coasting of the vehicle, relay means responsive to said circulating current for controlling the operation of the resistance-varying means during coasting of the vehicle, and means for recalibrating said relay means while the vehicle is in operation.

6. In a motor control system, in combination, a plurality of motors for propelling a vehicle, a source of power for the motors, switching means for connecting the motors to the power source, resistance-varying means for controlling the motor current during acceleration of the vehicle, switching means for establishing dynamic braking connections for the motors, a separate source of power for causing a current to circulate through the motors during coasting of the vehicle, said resistance-varying means being utilized to control the motor current during dynamic braking, relay means for controlling the operation of the resistance-varying means, and means for recalibrating the relay means when the vehicle is coasting.

7. In a motor control system, in combination, a plurality of motors for propelling a vehicle, a source of power for the motors, switching means for connecting the motors to the power source, a master controller for controlling the operation of said switching means, resistance-varying means for controlling the motor current during acceleration of the vehicle, a relay responsive to the motor current for governing the operation of the resistance-varying means, the operation of said relay being governed by said master controller, switching means for establishing dynamic braking connections for the motors, a braking controller for controlling the operation of said dynamic-braking switching means, said resistance-varying means being utilized to control the motor current during dynamic braking, and a relay responsive to the dynamic-braking current for governing the operation of said resistance-varying means during dynamic braking, the operation of said relay being governed by the braking controller.

8. In a motor control system, in combination, a plurality of motors for propelling a vehicle, a source of power for the motors, switching means for connecting the motors to the power source, a master controller for controlling the operation of said switching means, resistance-varying means for controlling the motor current during acceleration of the vehicle, a relay responsive to the motor current for governing the operation of the resistance-varying means, the operation of said relay being governed by said master controller, switching means for establishing dynamic-braking connections for the motors, a braking controller for controlling the operation of said dynamic-braking switching means, said resistance-varying means being utilized to control the motor current during dynamic braking, a relay responsive to the dynamic-braking current for governing the operation of said resistance-varying means during dynamic braking, the operation of said relay being governed by the braking controller, and means for recalibrating the last mentioned relay to be responsive to a low current when the vehicle is coasting.

9. In a motor control system, in combination, a motor for propelling a vehicle, switching means for connecting the motor to a source of power, variable-resistance means for controlling the motor current, means for operating the variable-resistance means, a current-limit relay for controlling the operation of the last-named means, a controller for governing the operation of the relay and said switching means, and means actuated by the limit relay for reversing the variable-resistance-operating means prior to the opening of the switching means to disconnect the motor from the power source.

10. In a motor control system, in combination, a motor for propelling a vehicle, switching means for connecting the motor to a source of power, variable-resistance means for controlling the motor current, a pilot motor for operating the variable-resistance means, a limit relay responsive to the motor current for controlling the operation of the pilot motor, a master controller for governing the operation of the limit relay and said switching means, and means associated with the master controller and the limit relay for reversing the pilot motor before the switching means is opened to disconnect the motor from the power source.

11. In a motor control system, in combination, a motor for propelling a vehicle, a variable-resistance means for controlling the motor current, a pilot motor for operating the variable-resistance means, a limit relay responsive to the motor current for controlling the operation of the pilot motor, and means actuated by the limit relay for reversing the pilot motor and for controlling the establishing of an electrical braking circuit for the pilot motor.

12. In a motor control system, in combination a motor for propelling a vehicle, variable-resistance means for controlling the motor current, a pilot motor for operating the variable-resistance means, a limit relay responsive to the motor current for controlling the operation of the pilot motor, and contact members on the relay for reversing the pilot motor and for controlling the establishing of an electrical braking circuit to stop the pilot motor.

13. In a motor control system, in combination, a motor for propelling a vehicle, variable-resistance means for controlling the motor current, a pilot motor for operating the variable-resistance means, a limit relay responsive to the motor current for controlling the operation of the pilot motor, said pilot motor having a field winding for each direction of rotation, and contact members on the relay for controlling the energization of said field windings to reverse the pilot motor, said contact members being disposed to control the establishing of an electrical braking circuit for the pilot motor.

NORMAN H. WILLBY.